United States Patent
Jeong

[11] Patent Number: 6,163,439
[45] Date of Patent: Dec. 19, 2000

[54] HEAD LOADING DEVICE AND METHOD IN A HARD DISK DRIVE

[75] Inventor: Jung-Si Jeong, Kumi, Rep. of Korea

[73] Assignee: SamSung Electronics Co., Ltd., Suwon, Rep. of Korea

[21] Appl. No.: 09/122,651

[22] Filed: Jul. 27, 1998

[30] Foreign Application Priority Data

Jul. 25, 1997 [KR]  Rep. of Korea ............. 97-34914

[51] Int. Cl.[7] ............................................. G11B 21/22
[52] U.S. Cl. ................................ 360/254.3; 29/603.03
[58] Field of Search ........................ 360/101, 104, 360/105, 107, 117, 119, 120, 121, 255.1, 255.2, 255.3, 255.4, 255.5, 254.2, 254.3, 254.4, 254.5; 369/44.11; 29/603.03

[56] References Cited

U.S. PATENT DOCUMENTS

| | | | |
|---|---|---|---|
| 4,423,456 | 12/1983 | Zaidenweber | 361/77 |
| 4,473,757 | 9/1984 | Farago | 307/127 |
| 4,661,873 | 4/1987 | Schulze | 360/105 |
| 5,231,549 | 7/1993 | Morehouse et al. | 360/75 |
| 5,278,808 | 1/1994 | Takano | 369/11 |
| 5,285,338 | 2/1994 | Sugahara et al. | 360/105 |
| 5,291,361 | 3/1994 | Yakota | 360/106 |
| 5,540,542 | 7/1996 | Krajec et al. | 414/751 |
| 5,831,795 | 11/1998 | Ma et al. | 360/105 |
| 5,875,074 | 2/1999 | Ho et al. | 360/105 |

FOREIGN PATENT DOCUMENTS

| | | |
|---|---|---|
| 1 393 748 | 5/1975 | United Kingdom . |
| 1 600 438 | 10/1981 | United Kingdom . |
| 2 175 463 | 11/1986 | United Kingdom . |

*Primary Examiner*—David L. Ometz
*Assistant Examiner*—Tianjie Chen
*Attorney, Agent, or Firm*—Robert E. Bushnell, Esq.

[57] ABSTRACT

A head loading device and method in a hard disk drive, the head loading device including a plate having a guide groove of a predetermined length, a body having a predetermined shape and installed to move along the guide groove, and a blade having a predetermined length and extending from an end portion of the body in a guiding direction, for vertically widening the gap between suspensions with heads in an actuator. Thus, the heads are loaded over disks by moving the body while the heads are spaced from each other by the blade.

16 Claims, 7 Drawing Sheets

HEAD LOADING DEVICE AND METHOD IN A HARD DISK DRIVE

CLAIM OF PRIORITY

This application makes reference to, incorporates the same herein, and claims all benefits accruing under 35 U.S.C. §119 from an application for HEAD LOADING DEVICE AND METHOD IN HARD DISK DRIVE earlier filed in the Korean Industrial Property Office on the 25$^{th}$ day of July 1997 and there duly assigned Ser. No. 34914/1997.

BACKGROUND OF THE INVENTION

1. Field of the Invention

The present invention relates to a hard disk drive, and in particular, to a head loading device and method in a hard disk drive, for stably loading heads, which are fixed at a plurality of suspensions installed on an arm of an actuator, between disks during an assembly of the hard disk drive.

2. Description of the Related Art

In a hard disk drive, a magnetic head (hereinafter, referred to as a head) generally reads or writes data from or on a disk being a magnetic recording medium, while moving over the disk at an infinitesimal flying height. The head is fixed to a suspension by soldering, and a signal at a head gap is transmitted to a flexible circuit board through a head wire. The head should move almost in contact with a disk surface to read and write data from and on the disk, which is enabled by flying the head with an air flow generated by the rotating force of the disk. In addition, a jig is used to dispose the head between disk surfaces without any damage to the head during an assembly of the hard disk drive.

An earlier head loading device in a hard disk drive includes a spindle motor installed on a base plate, for rotating hard disks, and a plurality of disks stacked around a driving shaft of the spindle motor at regular intervals. Then, an actuator including magnetic heads, suspensions, an arm, a bobbin, and a voice coil is rotatably fixed on a portion of the base plate by a rotating shaft. A hole is formed on a portion of the arm. Subsequently, a jig is installed on the actuator, for inserting the heads of the actuator between the disks.

The jig has a rib-shaped connecting portion. A handle protrudes upward from an end portion of the connecting portion to enable manual operation, and an installation protrusion extends from under the handle to be inserted into the hole on the arm. Then, an installation plate extends perpendicularly downward from the other end portion of the connecting portion. A plurality of separation ribs are perpendicularly formed on an end of the inner surface of the installation plate, spaced from one another by a predetermined distance. The distance between the installation protrusion and the separation ribs in the jig is equal to that between the installation hole and the suspensions in the actuator.

An earlier process for loading the heads of the actuator between the disks using the jig is described as follows. The installation protrusion in the jig is inserted into the installation hole on the actuator. Then, each of the suspensions having the heads is inserted between the separation ribs. The separation ribs vertically widen the gap between the suspensions to enable the heads to position between the disks. Then, the actuator having the jig is manually pushed as far as the outer circumferences of the disks, and the jig is removed from the actuator by turning the handle and pulling up the jig.

However, the above earlier head loading device in the hard disk drive has separation ribs so short that the heads are guided only as far as the outer circumferences of the disks. Therefore, the disk surfaces are susceptible to scratches and pecks by manually guiding the heads directly to parking zones of the disks.

Also, U.S. Pat. No. 5,540,542 to Krajec et al. entitled HDA Headload Carriage Tooling, disclose a tool that loads magnetic heads onto the disk of a hard disk drive, the tool having a first arm which has an alignment block and a plurality of fingers, with the first arm cooperating with a second arm which has an alignment slot and a plurality of second fingers. It is disclosed the arms are coupled to an actuator which moves the arms in opposite directions to separate the first fingers from the second fingers, with movement of the arms also causing a first alignment surface of the alignment block to engage a second alignment surface of the alignment slot. It is disclosed the alignment surfaces are essentially parallel with the fingers and insure that the fingers translate relative to each other without any relative rotational movement.

SUMMARY OF THE INVENTION

An object of the present invention is to provide a head loading device and method in a hard disk drive, for loading a suspension portion with heads to the parking zones of the disks in a hard disk drive at one time.

Another object of the present invention is to provide a head loading device and method in a hard disk drive, for inserting a head of an actuator between disks without rotating the disks and without making any contact between the head and disk surfaces.

To achieve the above and other objects of the present invention, there is provided a head loading device. The head loading device includes a plate having a guide groove of a predetermined length, a body having a predetermined shape and installed to move along the guide groove, and a blade having a predetermined length and extending from an end portion of the body in a guiding direction, for vertically widening the gap between suspensions with heads in an actuator. Thus, the heads are loaded over the disks by moving the body while the heads are spaced from each other by the blade.

To achieve the above and other objects of the present invention, there is provide a head loading method in a hard disk drive. In the head loading method, a body with a blade is installed to move along a guide groove formed in a plate, and a suspension having a head is loaded on a predetermined loading portion formed on an end portion of the blade so that the gap between suspensions is vertically widened. Then, the body is stopped by a first stopper installed on the plate when the head on the blade moves to art outer circumference of a disk, by a second stopper installed on the plate when the head is positioned over a middle circumference of the disk, and by a protrusion installed on the plate when the head reaches a parking zone of the disk.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
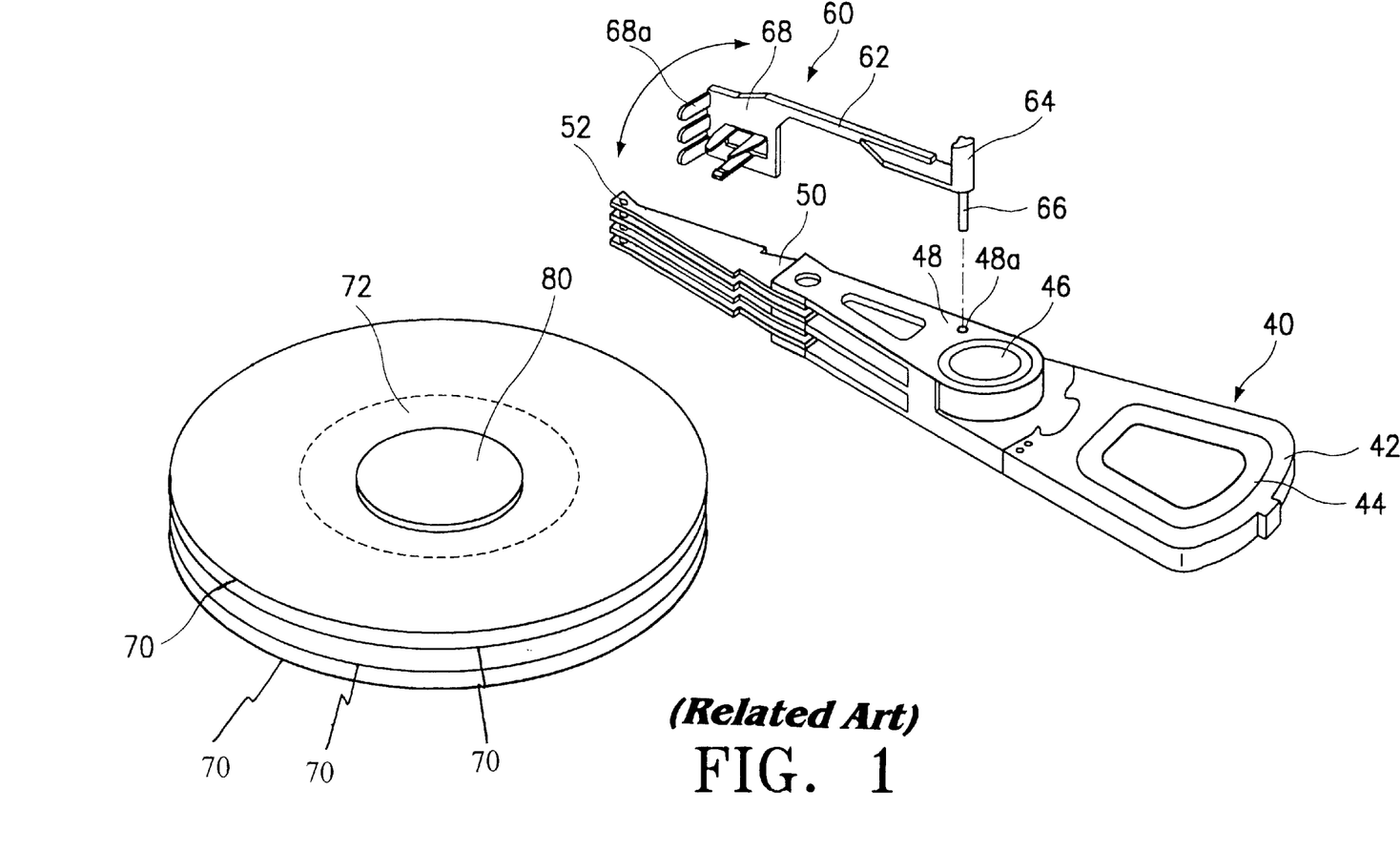
FIG. 1 is a perspective view of an earlier jig before it is inserted between heads of an actuator, and also illustrates an actuator, suspensions, and a plurality of stacked disks in a hard disk drive to which the present invention is applicable.

An earlier head loading device in a hard disk drive will be described referring to FIGS. 1 and 2. FIG. 1 is a perspective view of an earlier jig before it is inserted between heads of an actuator, and FIG. 2 is a perspective view of the earlier jig inserted between the heads of the actuator.

Figure 2:
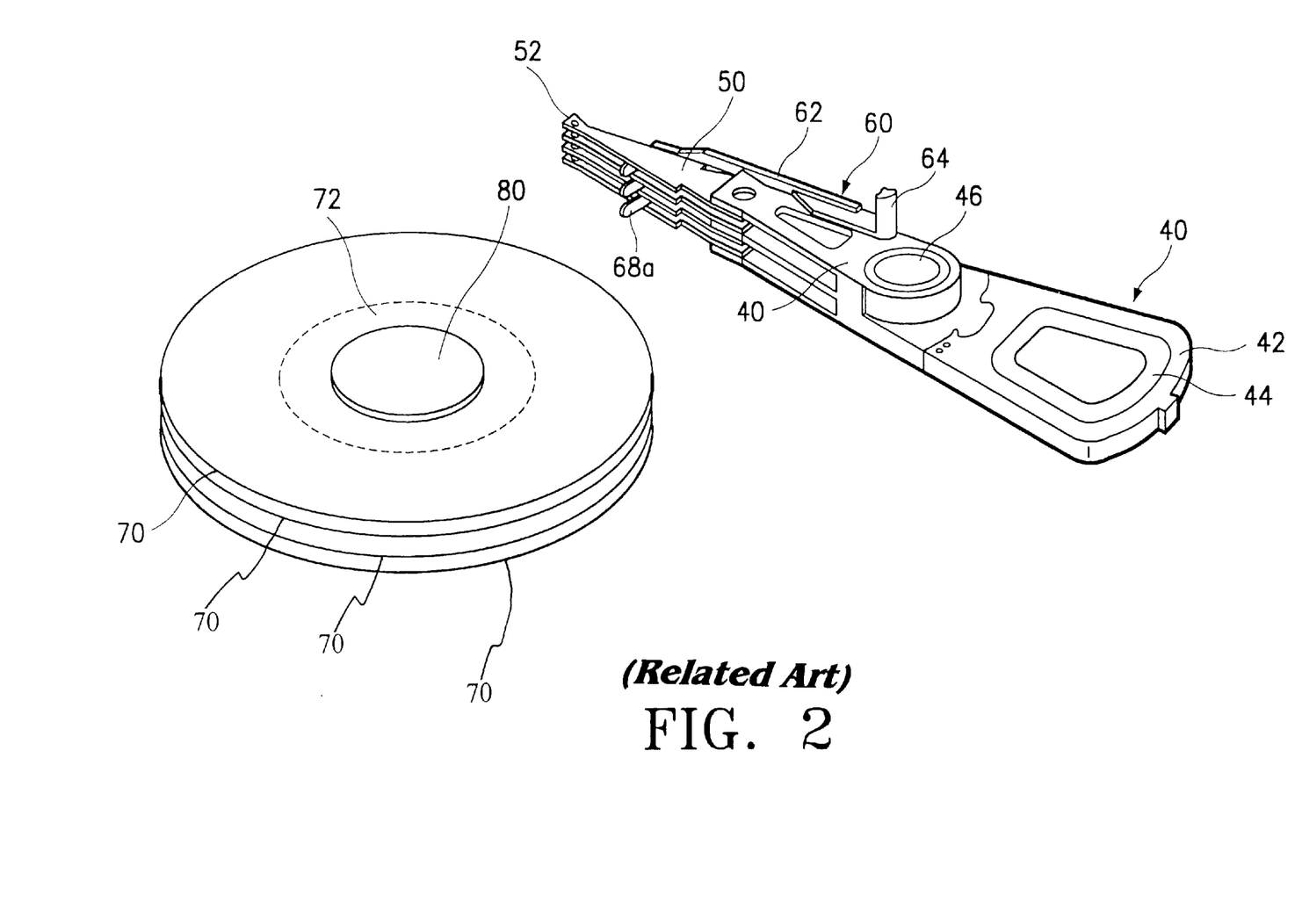
FIG. 2 is a perspective view of the jig of FIG. 1 inserted between the heads of the actuator, and also illustrates an actuator, suspensions, and a plurality of stacked disks in a hard disk drive to which the present invention is applicable.

Referring to FIGS. 1 and 2, a spindle motor 80 is installed on a base plate, for rotating hard disks 70, and a plurality of disks 70 are stacked around a driving shaft 72 of the spindle motor 80 at regular intervals. Then, an actuator 40 including magnetic heads 52, suspensions 50, an arm 48, a bobbin 42, and a voice coil 44 is rotatably fixed on a portion of the base plate by a rotating shaft 46. A hole 48a is formed on a portion of the arm 48. Subsequently, a jig 60 is installed on the actuator 40, for inserting the heads 52 of the actuator 40 between the disks 70.

The jig 60 has a rib-shaped connecting portion 62. A handle 64 protrudes upward from an end portion of the connecting portion 62 to enable manual operation, and an installation protrusion 66 extends from under the handle 64 to be inserted into the hole 48a on the arm 48. Then, an installation plate 68 extends perpendicularly downward from the other end portion of the connecting portion 62. A plurality of separation ribs 68a are perpendicularly formed on an end of the inner surface of the installation plate 68, spaced from one another by a predetermined distance. The distance between the installation protrusion 66 and the separation ribs 68a in the jig 60 is equal to that between the installation hole 48a and the suspensions 50 in the actuator 40.

A process for loading the heads 52 of the actuator 40 between the disks 70 using the earlier jig 60 is as follows. The installation protrusion 66 in the jig 60 is inserted into the installation hole 48a on the actuator 40. Then, as shown in FIG. 2, each of the suspensions 50 having the heads 52 is inserted between the separation ribs 68a. Here, the separation ribs 68a vertically widen the gap between the suspensions 50 to enable the heads 52 to position between the disks 70. Then, the actuator 40 having the jig 60 is manually pushed as far as the outer circumferences of the disks 70, and the jig 60 is removed from the actuator 40 by turning the handle 64 and pulling up the jig 60.

Figure 3:
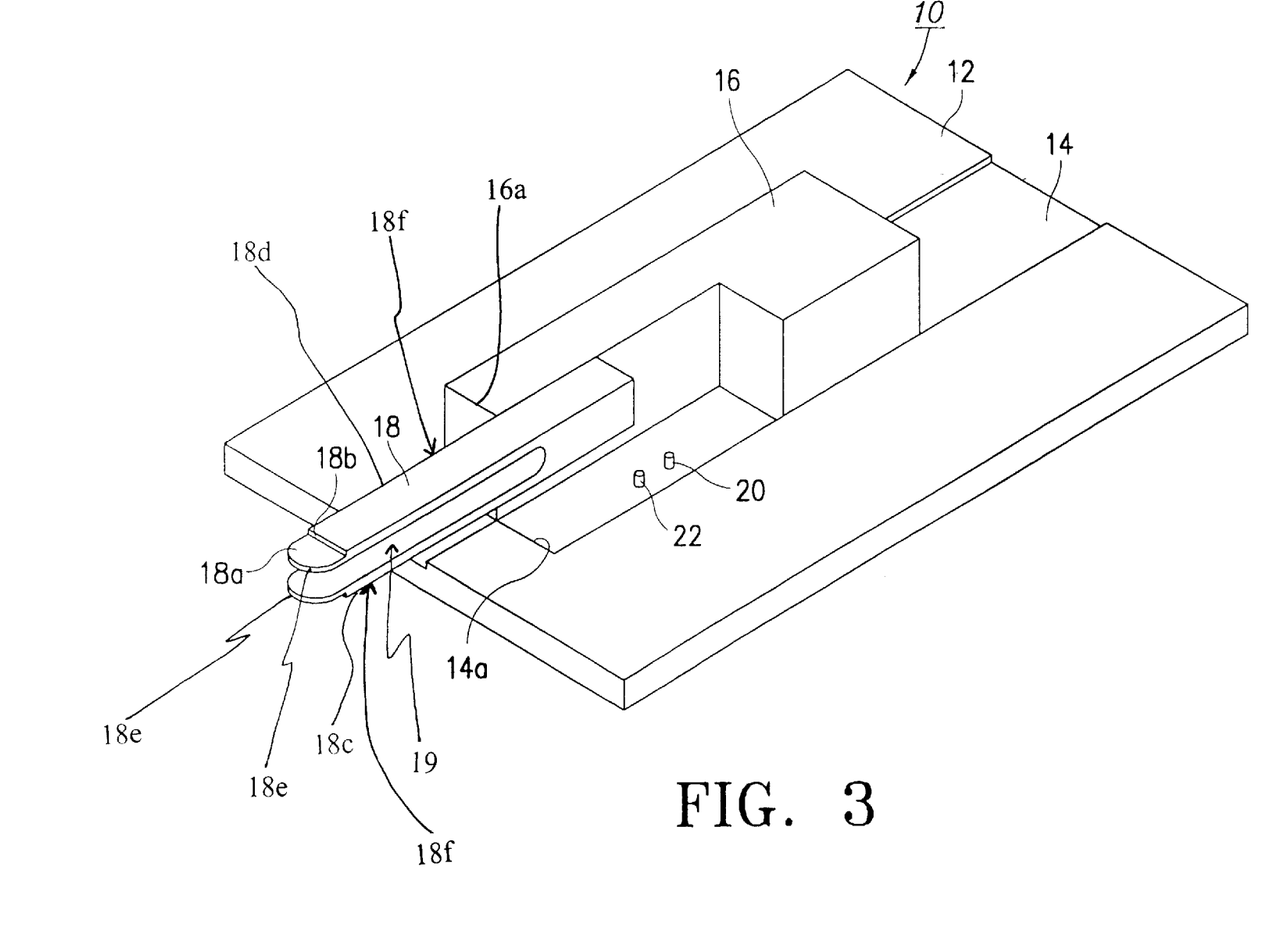
FIG. 3 is a perspective view of a head loading device according to a preferred embodiment of the present invention.
Figure 4:
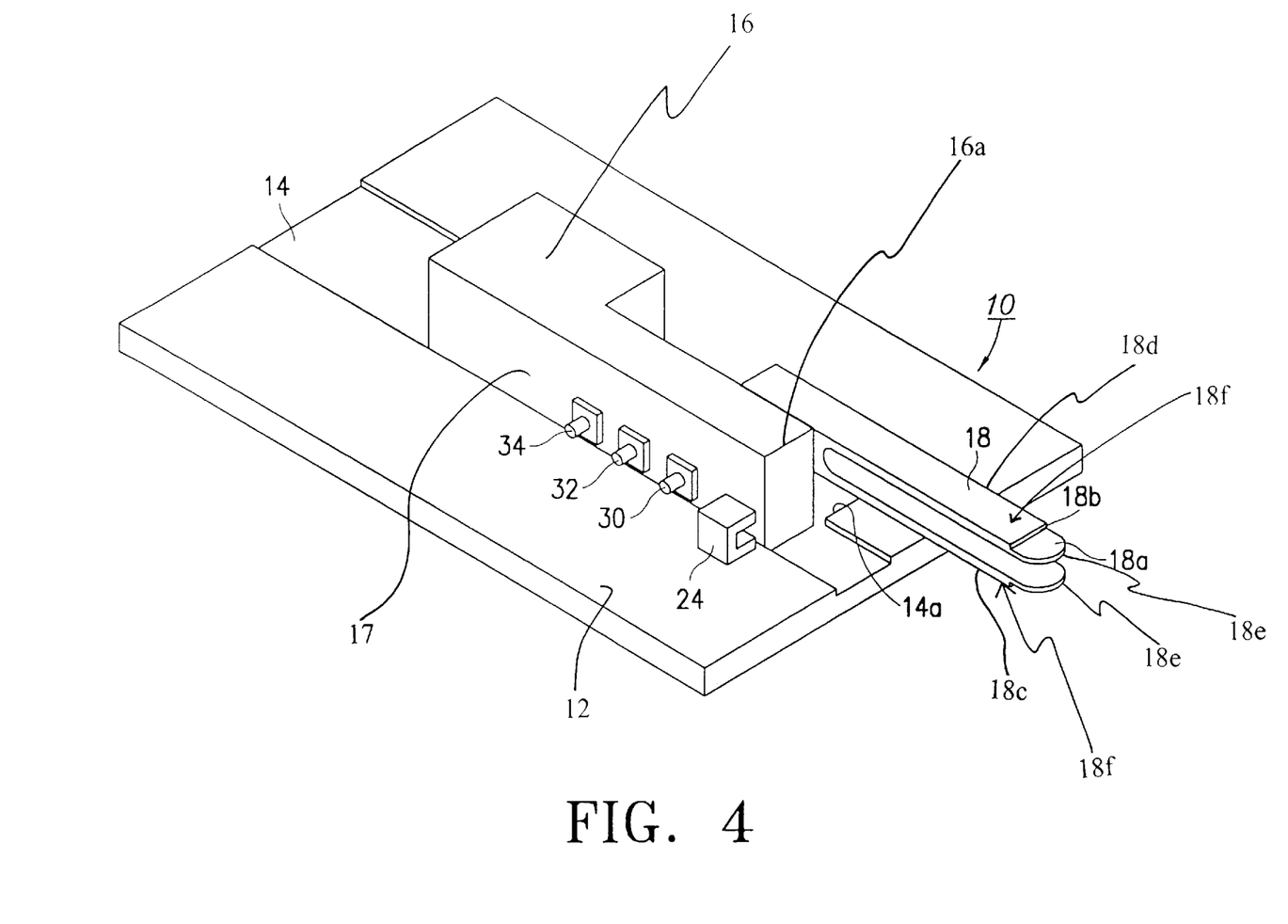
FIG. 4 is a perspective view of the head loading device of FIG. 3, taken from another view point, according to a preferred embodiment of the present invention.

Referring to FIGS. 3 and 4, FIGS. 3 and 4 are perspective views of a head loading device 10, respectively taken from different view points, according to a preferred embodiment of the present invention. As shown in FIGS. 3 and 4, the head loading device 10 has a plate 12 of a predetermined size, and a guide groove 14 is formed on the plate 12 to have a predetermined length along the diameter direction of a disk, such as a disk 70 of FIG. 1. Then, a body 16 of a predetermined size is formed to move along the guide groove 14, and one or a plurality of unitary blades 18 are formed at and extend from an end portion 16a of the body 16 in regular intervals, extending in a guiding direction, in order to load one or more heads in opposing relation to one or more disks by guiding suspensions while vertically widening the gap between the suspensions. A recess 19 is formed in each unitary blade 18 lengthwise from an end thereof. The recess is at least as long as the radius of the disk, and higher or greater than the thickness of the disk. A loading portion 18a for catching a suspension, such as a suspension 50, is formed on an outer end portion 18e of each sub-blade 18c, 18d branched from the blade 18 by the recess 19 to be lower than an outer surface 18f of the blade 18, sub-blade 18c being a lower portion of blade 18 and sub-blade 18d being an upper portion of blade 18.

Figure 5:
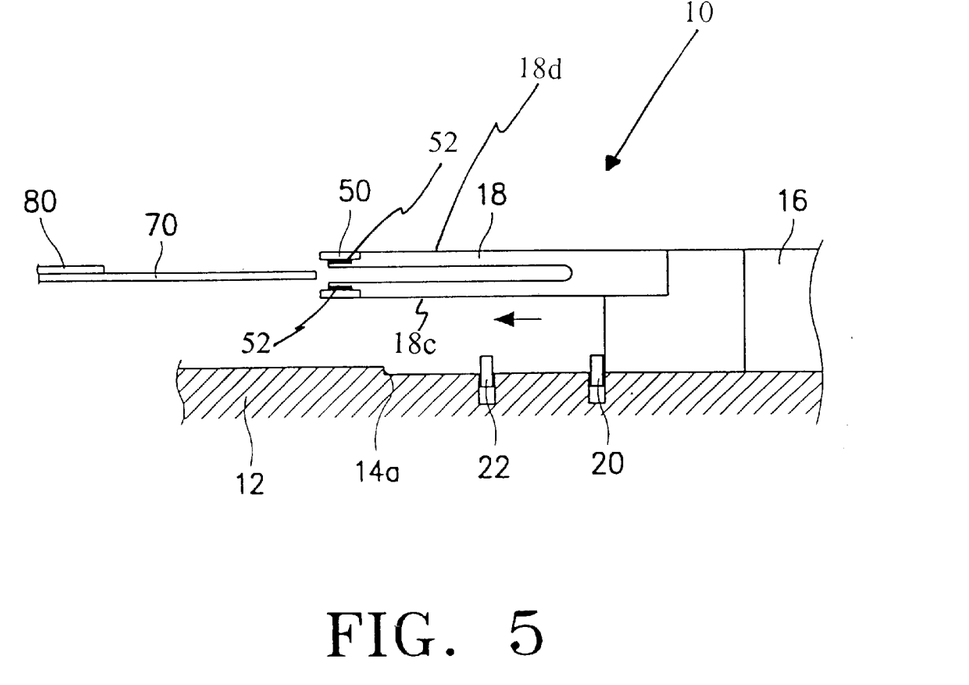
FIG. 5 is a side view of a disk which is about to be positioned between heads by the head loading device of FIG. 3 according to a preferred embodiment of the present invention.
Figure 6:
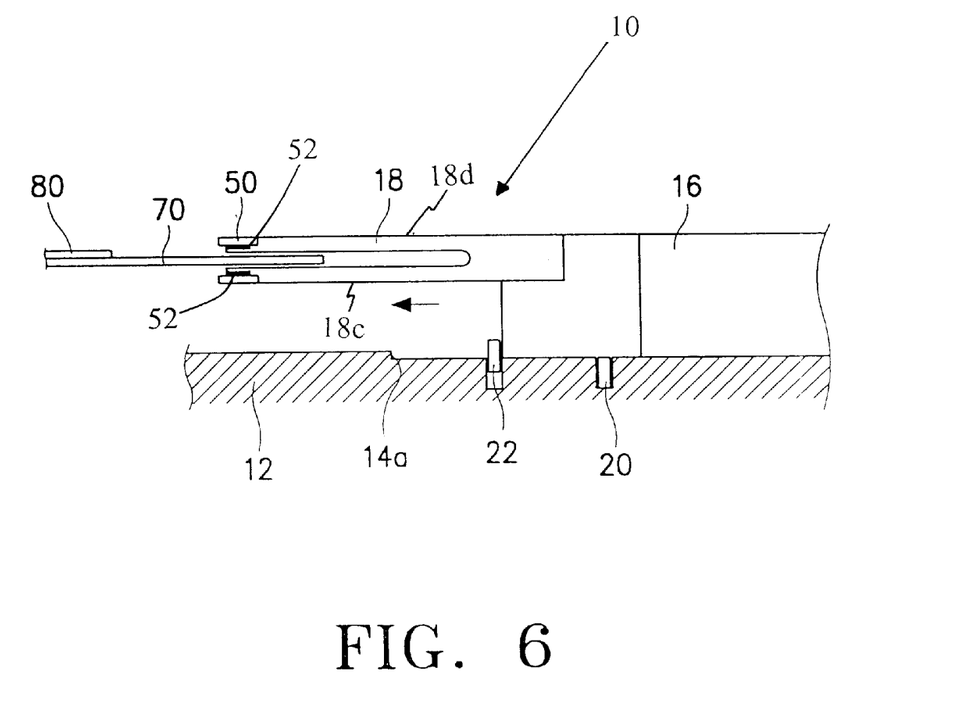
FIG. 6 is a side view of a disk being positioned between the heads by the head loading device of FIG. 3 according to a preferred embodiment of the present invention.

Then, a first stopper 20, a second stopper 22, and a protrusion 14a are formed on the bottom surface of the guide groove 14 in the plate 12. The first stopper 20 prevents the body 16 from further advancing when a head on a suspension loaded on the blade 18 reaches an outer circumference of a disk, such as illustrated in FIG. 5, and the second stopper 22 stops the body 16 when the head reaches a middle circumference of the disk, such as illustrated in FIG. 6. The protrusion 14a stops the body 16 when the head reaches a parking zone of the disk, such as illustrated in FIG. 7.

As illustrated in FIG. 4, a plurality of sensor brackets 30, 32, and 34 are installed on a side surface 17 of the body 16, in corresponding intervals to those for spacing the first stopper 20, the second stopper 22 and the protrusion 14a, respectively. A sensor 24 is installed on a surface of the plate 12, for sensing the sensor brackets 30, 32, and 34 corresponding to respective movement of the body 16. The first stopper 20 and the second stopper 22 each make cylinder-like movements when the sensor 24 senses them. The body 16 moves along the guide groove 14 of the plate 12, automatically or manually.

FIGS. 5 and 6 are side views of heads 52 to be positioned and positioned in opposing relation to a disk 70 by the head loading device 10, respectively, according to a preferred embodiment of the present invention. FIG. 7 is a side view of the heads 52 inserted as far as parking zones of a disk 70 by the head loading device 10 according to a preferred embodiment of the present invention.

Figure 7:
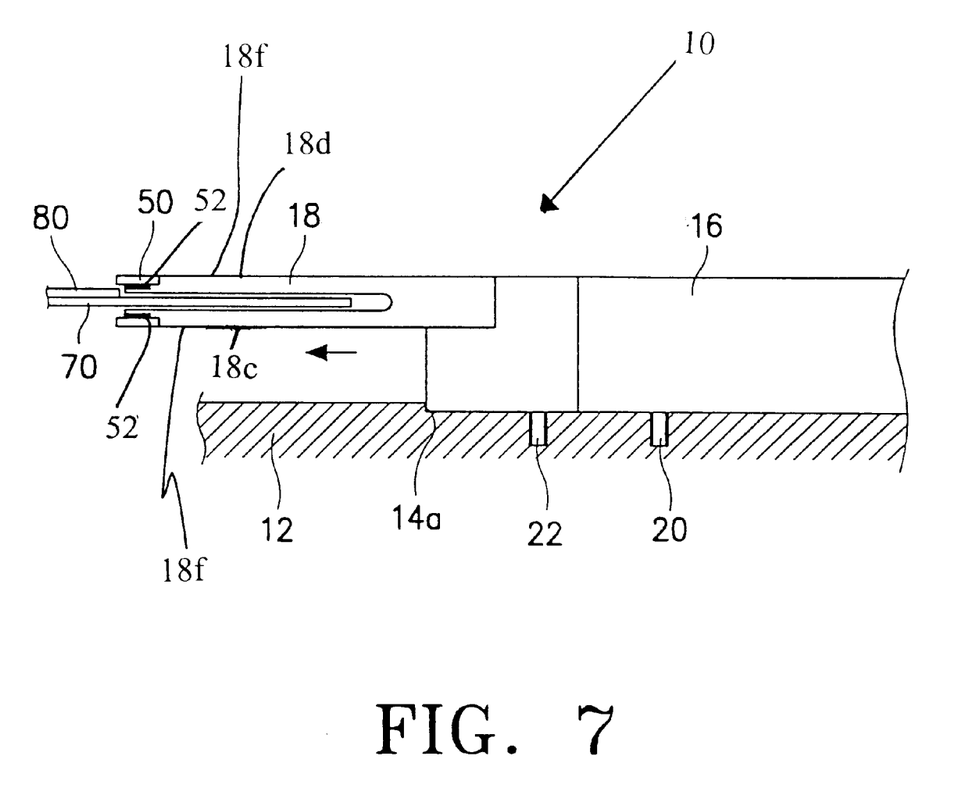
FIG. 7 is a side view of heads inserted as far as the parking zones of a disk of a hard disk drive by the head loading device of FIG. 3 according to a preferred embodiment of the present invention.

Referring to FIGS. 5–7, the operation of the head loading device 10 will be described. Suspensions 50 with heads 52 are stably loaded on end portions 18e of blades 18. Here, each blade 18 vertically widens the gap between the suspensions 50 in order to position the heads 52 in opposing relation to disk 70. That is, each suspension 50 is stably loaded onto the loading portion 18a at an end portion 18e of the opposing blade 18, such as on end portion 18e of sub-blades 18c and 18d, and does not slip along the length direction of the blade 18 due to a loading protrusion 18b formed by the loading portion 18a (FIGS. 3–4). Then, the body 16 advances along the guide groove 14 in the diameter direction of the disk 70, manually or by a predetermined power source.

Referring to FIGS. 3–7, the blade 18 divided into lower and upper sub-blades 18c and 18d, respectively, is stopped by the first stopper 20 engaging the body 16, and then the first stopper 20 moves down by the sensor 24 sensing the sensor bracket 30 to allow the body 16 to further advance in the direction of the arrow in FIGS. 5–7. When the blade 18 having the suspensions 50, such as suspensions 50 positioned on sub-blades 18c and 18d, moves as far as a middle circumference of the disk 70, it is stopped by the second stopper 22 engaging the body 16, as illustrated in FIG. 6. At this time, a voice coil motor assembly of an actuator, such as voice coil 44 of actuator 40 of FIG. 1, is loaded between upper and lower yolks on a base of a hard disk drive. Then, the second stopper 22 moves down by the sensor 24 sensing the sensor bracket 32 which is disposed at a position corresponding to the second stopper 22 on the other side surface 17 of the body 16, so that the body 16 can further advance in the arrowed direction. When the blade 18 reaches the parking zone of the disk 70, the blade 18 is stopped by the body 16 being caught by the protrusion 14a of the plate 12 and stopped by the sensor 24 sensing the sensor bracket 34 which is disposed at a position corresponding to the protrusion 14a on the other side surface 17 of the body 16, such as illustrated in FIG. 7. Then, the suspensions 50 of the actuator, such as actuator 40 of FIG. 1, are respectively positioned on a parking zone of a disk 70, and the head loading device 10 is removed from the suspensions 50, manually or automatically, such as by moving the body 16 in a reverse direction to the arrowed direction of FIGS. 5–7.

Figure 8:
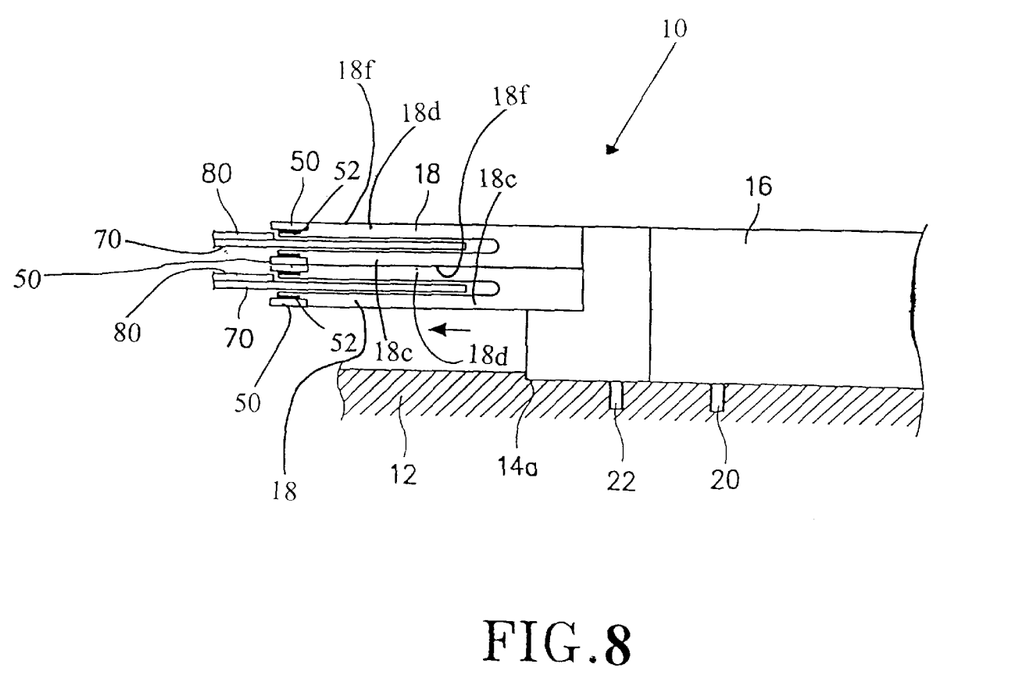
FIG. 8 is a side view of an embodiment of the present invention of a head loading device for positioning a plurality of disks between a plurality of heads.

FIG. 8 illustrates in a side view of an embodiment of the head loading device 10 of FIGS. 3 and 4 for positioning at one time a plurality of heads 52 in opposing relation to a plurality of disks 70. The head loading device illustrated in FIG. 8 has a plurality of blades 18 for loading suspensions 50 having the plurality of heads 52, and has similar components to the head loading device 10 of FIGS. 3 and 4. The operation of the head loading device 10 of FIG. 8 is similar to that described above with respect to FIGS. 3–7.

As described above, the head loading device 10 and method in a hard disk drive according to an embodiment of the present invention loads a head 52 over a disk 70 without rotating the disk 70 and without making any contact between the head 52 and a disk surface of a disk 70, thus preventing scratches or pecks on the disk surface. Further, since a device for rotating a spindle motor is not needed when loading the head over the disk, the time required to load heads is reduced, and positions of the head are adjusted by the sensor during a loading process.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modification may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A head loading device in a hard disk drive, comprising:
   a plate having a guide groove of a predetermined length;
   a body having a predetermined shape and installed to move along the guide groove; and
   a unitary blade having a predetermined length and extending from an end portion of said body and having a pair of opposing sub-blades for vertically widening a gap between opposing suspensions in an actuator for said hard disk drive, at least one of said opposing suspensions having a corresponding head, said unitary blade for respectively positioning at least one corresponding head in opposing relation to a disk in said hard disk drive when said body is moved in a guiding direction toward said disk, with said corresponding head being spaced from any other corresponding head on said opposing suspensions by said unitary blade, and with a recess being formed in said unitary blade lengthwise from an end portion of said unitary blade, said recess for receiving therein said disk, said recess being at least as long as the radius of said disk to be received in said recess and greater than the thickness of said disk to be received in said recess.

2. The head loading device in a hard disk drive as claimed in claim 1, further comprised of a loading protrusion for loading a suspension of the actuator thereon being formed on an outer end portion of each of an upper portion and a lower portion of said unitary blade, the loading protrusion formed on the outer end portion of the upper portion of said unitary blade and the loading protrusion formed on the outer end portion of the lower portion of said unitary blade being separated by said recess, each loading protrusion being formed so as to be lower than an outer surface of said unitary blade.

3. The head loading device in a hard disk drive as claimed in claim 2, further comprising:
   a first stopper, said first stopper being formed on a bottom surface of the guide groove, said first stopper for stopping said body when a head on a suspension loaded on said unitary blade moves to an outer circumference of said disk;
   a second stopper, said second stopper being formed on the bottom surface of the guide groove, said second stopper for stopping said body when a head on a suspension loaded on said unitary blade is positioned in opposing relation to a middle circumference of said disk; and
   a protrusion, said protrusion being formed on the bottom surface of the guide groove, said protrusion for catching said body when a head on a suspension loaded on said unitary blade reaches a parking zone of said disk.

4. The head loading device in a hard disk drive as claimed in claim 3, further comprising:
   a plurality of sensor brackets, said plurality of sensor brackets being installed on a side surface of said body in intervals corresponding to respective intervals for said first stopper, said second stopper, and said protrusion; and
   a sensor, said sensor being installed on a surface of said plate for sensing at least one of said plurality of sensor brackets while said body is moving along the guide groove.

5. The head loading device in a hard disk drive as claimed in claim 4, further comprised of said first stopper and said second stopper move in an upward direction and in a downward direction in a cylinder-like motion to respectively engage and disengage with said body when said sensor respectively senses a sensor bracket of said plurality of sensor brackets corresponding to said first stopper and senses a sensor bracket of said plurality of sensor brackets corresponding to said second stopper.

6. A head loading device in a hard disk drive, comprising:

a plate having a guide groove of a predetermined length;

a body having a predetermined shape and installed to move along the guide groove;

a blade having a predetermined length and extending from an end portion of said body for vertically widening a gap between opposing suspensions in an actuator for said hard disk drive, at least one of said opposing suspensions having a corresponding head, said blade for respectively positioning at least one corresponding head in opposing relation to a disk in said hard disk drive when said body is moved in a guiding direction toward said disk, with said corresponding head being spaced from any other corresponding head on said opposing suspensions by said blade;

a first stopper, said first stopper being formed on a bottom surface of the guide groove, said first stopper for stopping said body when a head on a suspension loaded on said blade moves to an outer circumference of said disk;

a second stopper, said second stopper being formed on the bottom surface of the guide groove, said second stopper for stopping said body when a head on a suspension loaded on said blade is positioned in opposing relation to a middle circumference of said disk; and a protrusion, said protrusion being formed on the bottom surface of the guide groove, said protrusion for catching said body when a head on a suspension loaded on said blade reaches a parking zone of said disk.

7. The head loading device in a hard disk drive as claimed in claim 6, further comprising:

a plurality of sensor brackets, said plurality of sensor brackets being installed on a side surface of said body in intervals corresponding to respective intervals for said first stopper, said second stopper, and said protrusion; and a sensor, said sensor being installed on a surface of said plate for sensing at least one of said plurality of sensor brackets while said body is moving along the guide groove.

8. The head loading device in a hard disk drive as claimed in claim 7, further comprised of said first stopper and said second stopper move in an upward direction and in a downward direction in a cylinder-like motion to respectively engage and disengage with said body, when said sensor installed on the surface of said plate respectively senses a sensor bracket of said plurality of sensor brackets corresponding to said first stopper and senses a sensor bracket of said plurality of sensor brackets corresponding to said second stopper.

9. The head loading device in a hard disk drive as claimed in claim 6, further comprised of said first stopper and said second stopper move in an upward direction and in a downward direction in a cylinder-like motion to respectively engage and disengage with said body, when a sensor installed on a surface of said plate respectively senses a sensor bracket installed on a side surface of said body corresponding to said first stopper and senses a sensor bracket installed on a side surface of said body corresponding to said second stopper.

10. A head loading device in a hard disk drive, comprising:

a plate having a guide groove of a predetermined length;

a body having a predetermined shape and installed to move along the guide groove;

a plurality of unitary blades, each of said plurality of unitary blades having a predetermined length and extending from an end portion of said body and having a pair of opposing sub-blades for vertically widening a gap between opposing suspensions in an actuator for said hard disk drive, with at least one of the opposing suspensions having a corresponding head, said plurality of unitary blades for respectively positioning each of a plurality of heads in opposing relation to one of a plurality of disks in said hard disk drive while moving said body in a guiding direction towards said plurality of disks, and with a recess being formed in each of said plurality of unitary blades lengthwise from an end portion of each unitary blade for receiving a disk of said hard disk drive, each recess being at least as long as the radius of a disk to be received in a corresponding recess and greater than the thickness of a disk to be received in the corresponding recess.

11. The head loading device in a hard disk drive as claimed in claim 10, further comprised of for each of said plurality of unitary blades, a loading protrusion for loading a suspension of the actuator thereon is formed on an outer end portion of each of an upper portion and a lower portion of a corresponding unitary blade, the upper portion and the lower portion of the corresponding unitary blade being separated by a corresponding recess, with each loading protrusion being formed to be lower than an outer surface of the corresponding unitary blade.

12. A head loading device in a hard disk drive, comprising:

a plate having a guide groove of a predetermined length;

a body having a predetermined shape and installed to move along the guide groove;

a plurality of blades, each of said plurality of blades having a predetermined length and extending from an end portion of said body for vertically widening a gap between opposing suspensions in an actuator for said hard disk drive, with at least one of the opposing suspensions having a corresponding head, said plurality of blades for respectively positioning each of a plurality of heads in opposing relation to one of a plurality of disks in said hard disk drive while moving said body in a guiding direction towards said plurality of disks;

a first stopper, said first stopper being formed on a bottom surface of the guide groove, said first stopper for stopping said body when a head on a suspension loaded on one of said plurality of blades moves to an outer circumference of a disk of said plurality of disks;

a second stopper, said second stopper being formed on the bottom surface of the guide groove, said second stopper for stopping said body when a head on a suspension loaded on one of said plurality of blades is positioned in opposing relation to a middle circumference of a disk of said plurality of disks; and a protrusion, said protrusion being formed on the bottom surface of the guide groove, said protrusion for catching said body when a head on a suspension loaded on one of said plurality of blades reaches a parking zone of a disk of said plurality of disks.

13. The head loading device in a hard disk drive as claimed in claim 12, further comprising:

a plurality of sensor brackets, said plurality of sensor brackets being installed on a side surface of said body in intervals corresponding to respective intervals for said first stopper, said second stopper, and said protrusion; and a sensor, said sensor being installed on a surface of said plate for sensing at least one of said plurality of sensor brackets while said body is moving along the guide groove.

14. The head loading device in a hard disk drive as claimed in claim 13, further comprised of said first stopper and said second stopper move in an upward direction and in a downward direction in a cylinder-like motion to respectively engage and disengage with said body when said sensor respectively senses a sensor bracket of said plurality of sensor brackets corresponding to said first stopper and senses a sensor bracket of said plurality of sensor brackets corresponding to said second stopper.

15. A head loading method for a hard disk drive, comprising the steps of:

installing a body with at least one blade to move along a guide groove formed in a plate;

loading a suspension having a head on a predetermined loading portion formed on an end portion of a corresponding blade so that a gap between adjacent suspensions is vertically widened;

stopping the body by a first stopper installed on the plate when the head on the suspension loaded on the corresponding blade moves to an outer circumference of a corresponding disk;

stopping the body by a second stopper installed on the plate when the head is positioned in opposing relation to a middle circumference of the corresponding disk; and stopping the body by a protrusion installed on the plate when the head reaches a parking zone of the corresponding disk.

16. The head loading method for a hard disk drive as claimed in claim 15, wherein the body is installed with a plurality of blades.

* * * * *